United States Patent
Schaller et al.

(10) Patent No.: US 7,604,883 B2
(45) Date of Patent: Oct. 20, 2009

(54) THERMAL INTEGRATION OF PRESSURIZED FUEL CELL SYSTEMS WITH AN EXPANDER AND A HEAT EXCHANGER COUPLED TO THE FUEL CELL FOR RECEIVING WASTE HEAT FROM THE HOUSING OF THE FUEL CELL

(75) Inventors: Rolf Schaller, Stuttgart/Vaihingen (DE); Jason W Buelow, Livonia, MI (US)

(73) Assignee: Chrysler Group LLC, Auburn Hills, MI (US)

( * ) Notice: Subject to any disclaimer, the term of this patent is extended or adjusted under 35 U.S.C. 154(b) by 1030 days.

(21) Appl. No.: 10/622,165

(22) Filed: Jul. 17, 2003

(65) Prior Publication Data
US 2005/0014045 A1    Jan. 20, 2005

(51) Int. Cl.
*H01M 8/04* (2006.01)
(52) U.S. Cl. ........................................................ 429/12
(58) Field of Classification Search ................... 429/17, 429/12
See application file for complete search history.

(56) References Cited

U.S. PATENT DOCUMENTS

| | | | |
|---|---|---|---|
| 3,973,993 A | 8/1976 | Bloomfield et al. | |
| 4,333,992 A | 6/1982 | Healy | |
| 4,473,622 A | 9/1984 | Chludzinski et al. | |
| 4,622,275 A | * 11/1986 | Noguchi et al. | ................ 429/19 |
| 4,743,516 A | 5/1988 | Noguchi et al. | |
| 6,316,134 B1 | * 11/2001 | Cownden et al. | ............... 429/19 |
| 6,365,289 B1 | 4/2002 | Lee et al. | |
| 6,365,290 B1 | 4/2002 | Ghezel-Ayagh et al. | |
| 6,521,366 B1 | 2/2003 | Lamm et al. | |
| 6,551,732 B1 | * 4/2003 | Xu | ............................... 429/17 |

\* cited by examiner

*Primary Examiner*—Mark Ruthkosky
(74) *Attorney, Agent, or Firm*—Ralph E. Smith

(57) ABSTRACT

A fuel cell system having a fuel cell with an anode chamber separated from a cathode chamber by a proton exchange membrane. The cathode chamber receives a compressed oxygen-containing gas and discharges it to a cathode exhaust gas line. The cathode exhaust gas is cooled to remove excess moisture. The cathode exhaust gas line then flows through a heat exchanger that is coupled to the fuel cell for receiving waste heat of the fuel cell and transferring it to the cathode exhaust gas. The heated cathode exhaust gas then flows to an expansion turbine, where additional fuel cell waste heat is transferred to the exhaust gas. The greater work performed by the higher energy exhaust gas passing through the expansion turbine increases the overall efficiency of the fuel cell system.

5 Claims, 2 Drawing Sheets

THERMAL INTEGRATION OF PRESSURIZED FUEL CELL SYSTEMS WITH AN EXPANDER AND A HEAT EXCHANGER COUPLED TO THE FUEL CELL FOR RECEIVING WASTE HEAT FROM THE HOUSING OF THE FUEL CELL

CROSS-REFERENCE TO RELATED APPLICATIONS

Not applicable.

STATEMENT REGARDING FEDERALLY SPONSORED RESEARCH

Not applicable.

BACKGROUND OF THE INVENTION

1. Field of the Invention

The invention relates to thermal management of pressurized fuel cell systems with compressor/expander systems.

2. Description of Related Art

The general arrangement of a pressurized fuel cell system is disclosed in U.S. Pat. No. 6,521,366 to Lamm et al. The fuel cell system has an anode chamber and a cathode chamber separated from one another by a proton-conducting membrane, also known as a proton exchange membrane (PEM). A cathode supply line supplies gas containing oxygen to the cathode chamber, and an anode supply line supplies a liquid coolant/fuel mixture to the anode chamber. The anode chamber is located in an anode circuit that includes a gas separator and a pump, and with a cooler and a water separator being located in the separated gas flow from the gas separator in the flow direction.

In a further arrangement of a fuel cell power system disclosed in U.S. Pat. No. 6,551,732 to Xu, the fuel cell processes air through the cathode to yield a cathode effluent stream. The fuel cell power system further includes a fuel processor for converting an inlet fuel stream of hydrogen- and carbon-containing fuels, utilizing a stream of oxygen-containing gas and water vapor, to a processed fuel stream of hydrogen molecules for feeding into the fuel cell anode. The system then feeds a substantial portion of the cathode effluent stream to the fuel processor as the oxygen-containing gas and water vapor for converting the fuel stream into hydrogen. A portion of the cathode effluent stream is also available for burning with a substantially hydrogen depleted gas exiting the anode in a combustor, the exhaust of the combustor being then passed through an expander for powering an input air compressor.

The fuel cell integral to these systems generates a substantial amount of "waste" heat, as do other components such as the combustor. Removal of this waste heat is generally accomplished by a cooling system, or the heat energy is simply expelled to the environment. It would be advantageous to increase the efficiency of the fuel cell system by reducing the "waste" and converting more of the heat generated by the fuel cell and other system components into useful work, thereby increasing the efficiency of the system.

BRIEF SUMMARY OF THE INVENTION

A fuel cell system comprises a fuel cell having a housing enclosing an anode chamber, a proton exchange membrane and a cathode chamber. The cathode chamber is separated from the anode chamber by the proton exchange membrane. The housing is adapted to transfer waste heat from the fuel cell. A cathode supply line is coupled to a supply of compressed oxygen-containing gas and to the cathode chamber. An anode supply line is coupled to a liquid fuel mixture supply and to the anode chamber.

The fuel cell system also includes a cathode exhaust gas line, a heat exchanger coupled to the fuel cell for receiving waste heat of the fuel cell, and an expansion turbine. The cathode exhaust gas line fluidly connects the cathode chamber and the expansion turbine. The heat exchanger is thermally coupled to the cathode exhaust gas line between the cathode chamber and the expansion turbine, so that the heat exchanger can transfer energy from the waste heat of the fuel cell to cathode exhaust gas flowing through the cathode exhaust gas line.

BRIEF DESCRIPTION OF THE SEVERAL VIEWS OF THE DRAWINGS

The present invention will become more fully understood from the detailed description and the accompanying drawings, wherein.

DETAILED DESCRIPTION OF THE INVENTION

Figure 1:
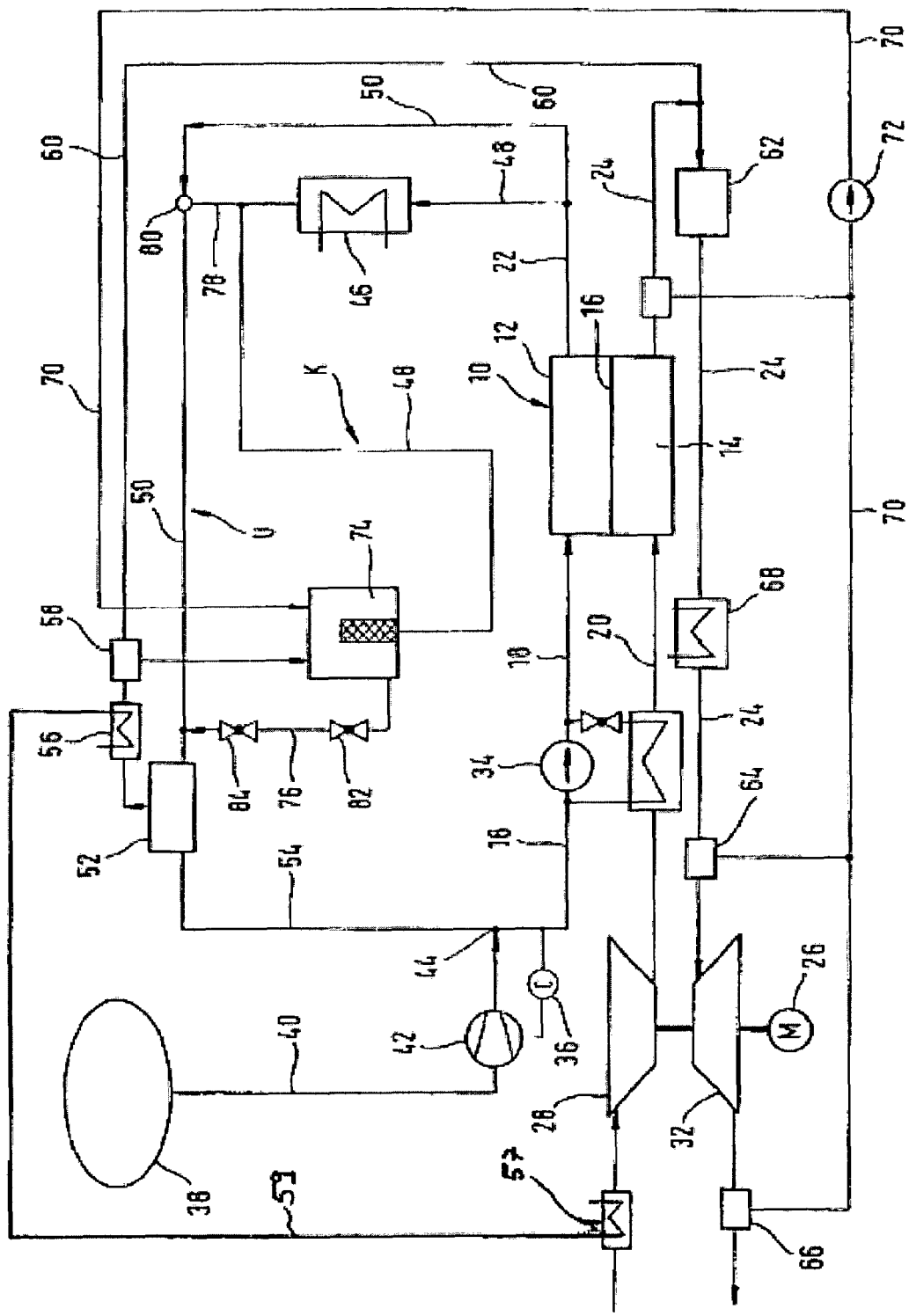
FIG. 1 is a schematic of a representative prior art pressurized fuel cell system with expander.

Referring to FIG. 1, a prior art fuel cell system is shown substantially as disclosed in U.S. Pat. No. 6,521,366 to Lamm et al., which is incorporated herein in its entirety. The fuel cell system includes a fuel cell 10 having an anode chamber 12 and a cathode chamber 14 separated from one another by a proton-conducting membrane 16. A liquid coolant/fuel mixture is supplied to anode chamber 12 through an anode supply line 18. Any substance with the general structural formula H—$[CH_2O]_n$—Y with 1<n<5 and Y=H or Y=$CH_3$ that is liquid at room temperature and electrically oxidizable can be used as fuel. Methanol, an example of such a substance, will be cited in further describing the fuel cell system.

A gas containing oxygen is fed into cathode chamber 14 through cathode supply line 20. Ambient air is commonly used for this purpose due to its ready availability. In fuel cell 10, the fuel is oxidized at the anode and the oxygen is reduced at the cathode. For this purpose, the proton-conducting membrane 16 is coated on the appropriate surfaces with a suitable catalyst. Protons can thus migrate from the anode side through proton-conducting membrane 16 and bond with the oxygen ions on the cathode side to form water. In this electrochemical reaction, a potential develops between the two electrodes. By connecting many such cells in parallel or in series to form a so-called stack, potentials and currents can be produced that are sufficient to drive a vehicle.

Carbon dioxide gas enriched with water and methanol is produced at the anode outlet. This mixture of liquid and gas is removed through an anode drain line 22 from anode chamber 12. The further handling of the anode exhaust is discussed in detail by Lamm et al.

Cathode exhaust air containing the remaining oxygen and water vapor is removed through a cathode exhaust gas drain line 24. To obtain good efficiency, the ambient air in cathode chamber 14 is prepared under pressure. For this purpose, a compressor 28 driven by an electric motor 26 is located in cathode supply line 20; the compressor draws in the desired air and compresses it to the required pressure. During operation with ambient air, an air filter (not shown) is provided upstream of compressor 28, preferably in the inlet area of cathode supply line 20. Some of the energy required to compress the ambient air can be recovered by an expander 32 located in cathode drain line 24. Preferably, compressor 28, expander 32, and electric motor 26 are mounted on a common shaft. The fuel cell power can be controlled by controlling or regulating the compressor rpm and hence the available airflow.

The oxygen-rich cathode exhaust air is first mixed with a portion of dry carbon dioxide containing a small amount of residual methanol supplied from anode exhaust, and reacted in an exhaust catalytic converter 62 located in cathode exhaust line 24, to form carbon dioxide and water vapor. The cathode exhaust air is then cooled down to a specific temperature by heat exchanger 68. In order to separate at least a portion of the water vapor as water from the cathode exhaust air, a water separator 64 is located in cathode exhaust line 24 upstream of expander 32. Expander 32 acts as a compact condensation turbine.

Figure 2:
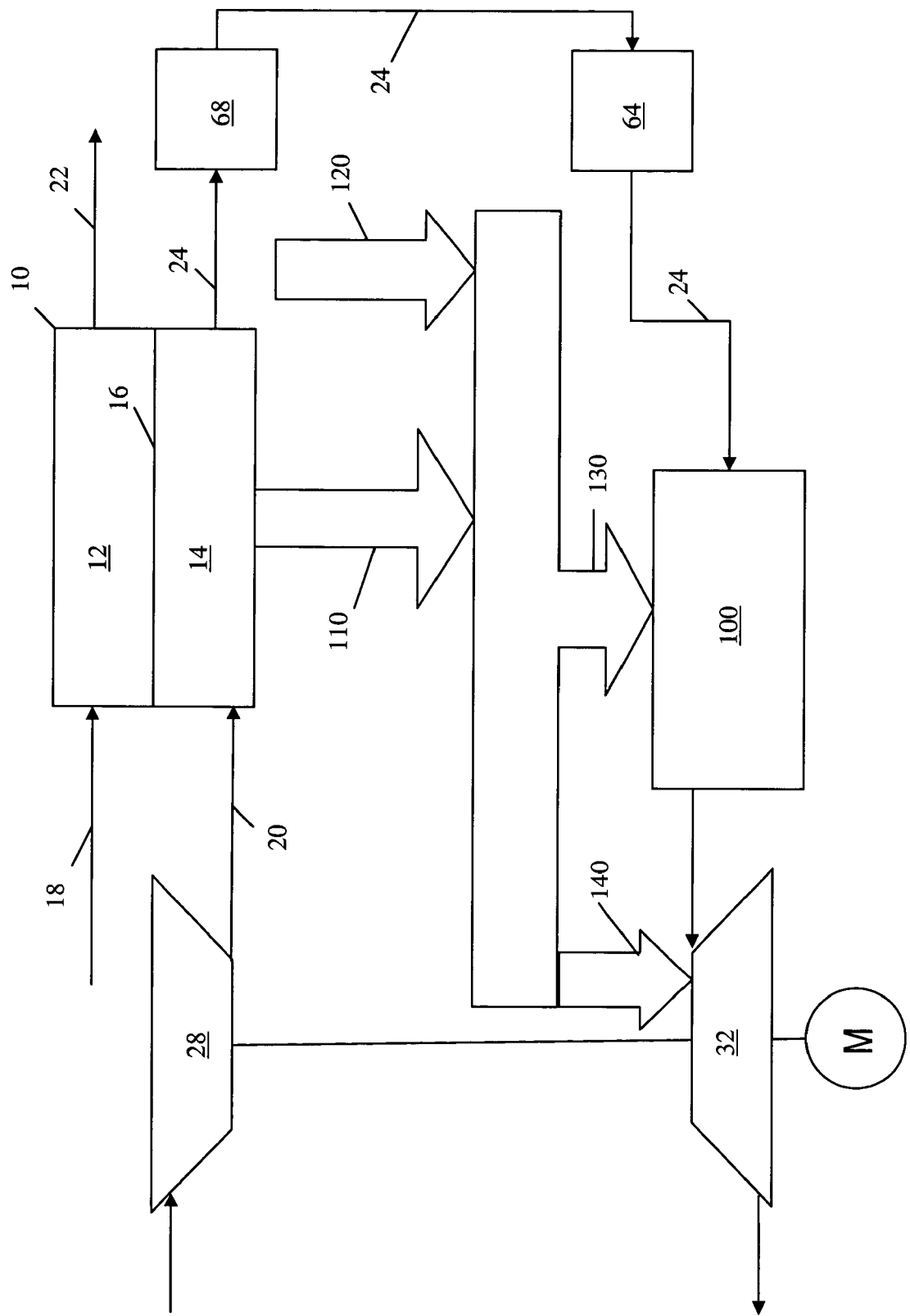
FIG. 2 is a schematic of the thermal integration of a pressurized fuel cell system with expander according to the invention.

With reference now to FIG. 2, the cathode exhaust line 24 passes through an additional heat exchanger 100. Waste heat 110 of the fuel cell 10 is collected and passed to heat exchanger 100. Additional waste heat 120 from other system components and sources found in fuel cell power systems, such as combustors, compressed gas, or fuel processors or reformers, can also be combined with the waste heat 110 from the fuel cell 10.

The waste heat 110, 120 can be transferred by any one of a plethora of heat transfer methods. This can include direct conduction, such as incorporating the cathode exhaust line 24 into an outer housing of the fuel cell 10 or other component, natural convection of heated air or other fluids from the heat source to a radiator-type structure incorporating the cathode exhaust gas line 24, or a system incorporating pumping of a heat transfer medium to a heat exchanger thermally coupled to the cathode exhaust gas line 24.

As cathode exhaust gas passes through the heat exchanger 100 within cathode exhaust line 24, heat energy 130 of the waste heat 110, 120 is transferred to the cathode exhaust gas by the heat exchanger 100. The energy contained in the cathode exhaust gas is thereby increased.

The waste heat 110, 120 is further conducted to the expander 32, so that additional heat energy 140 is transferred to the cathode exhaust gas as it expands within the expander 32, further increasing its stored energy. The expanding exhaust gas will thus be able to perform more work due to its overall higher energy, increasing the overall efficiency of the system.

The transfer of this heat energy to the exhaust gas also has the added benefit of cooling the fuel cell system as more excess heat energy is removed from the system as the exhaust gas is expelled through the expander. The capacity of a cooling system for the fuel cell power system can thus be reduced because of the smaller thermal load that it must handle.

The invention is applicable to the cathode side of fuel cell systems utilizing fuel compositions or forms in the anode chamber other than those disclosed. While the invention has been described in the specification and illustrated in the drawings with reference to a preferred embodiment, it will be understood by those skilled in the art that various changes may be made and equivalents may be substituted for elements thereof without departing from the scope of the invention as defined in the claims.

In addition, many modifications may be made to adapt a particular situation or material to the teachings of the invention without departing from the essential scope thereof. Therefore, it is intended that the invention not be limited to the particular embodiment illustrated by the drawings and described in the specification as the best mode presently contemplated for carrying out this invention, but that the invention will include any embodiments falling within the scope of the appended claims.

What is claimed is:

1. A fuel cell system comprising:
    a fuel cell having a housing enclosing an anode chamber, a proton exchange membrane and a cathode chamber, the cathode chamber being separated from the anode chamber by the proton exchange membrane, the housing adapted to transfer waste heat of the fuel cell;
    a cathode supply line coupled to a supply of compressed oxygen-containing gas and to the cathode chamber;
    a fuel supply coupled to the anode chamber;
    a cathode exhaust gas line;
    a heat exchanger coupled to the fuel cell for receiving waste heat from the housing of the fuel cell; and
    an expansion turbine,
    the cathode exhaust gas line fluidly connecting the cathode chamber and the expansion turbine, the heat exchanger being thermally coupled to the cathode exhaust gas line between the cathode chamber and the expansion turbine, whereby the heat exchanger transfers heat energy from the fuel cell to cathode exhaust gas flowing through the cathode exhaust gas line.

2. The fuel cell system of claim 1, wherein the expansion turbine is coupled to the fuel cell for transfer of heat energy from the fuel cell to cathode exhaust gas in the expansion turbine.

3. The fuel cell system of claim 2, further comprising a combustor assembly coupled to the heat exchanger and the expansion turbine for transfer of heat energy to the cathode exhaust gas.

4. The fuel cell system of claim 1, further comprising a combustor assembly coupled to the heat exchanger for transfer of heat energy to cathode exhaust gas flowing through the cathode exhaust gas line.

5. The fuel cell system of claim 1, further comprising a cathode exhaust gas cooler and water separator fluidly connected between the cathode chamber and the heat exchanger.

* * * * *